Dec. 7, 1937.  J. D. RUST ET AL  2,101,100
COTTON PICKING MACHINE
Filed Oct. 16, 1935  4 Sheets-Sheet 1

Inventors
JOHN D. RUST
MACK D. RUST
By Albert E. Dieterich
Attorney

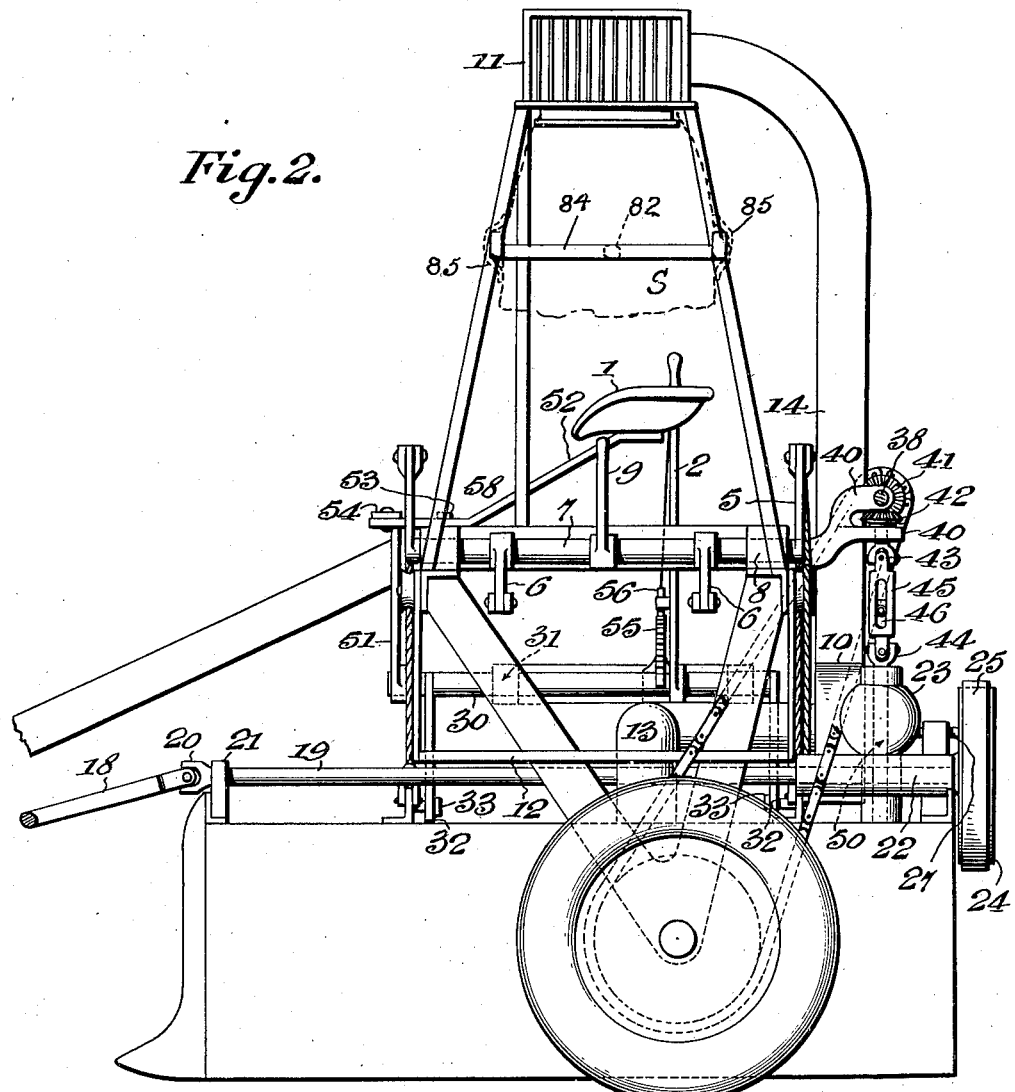
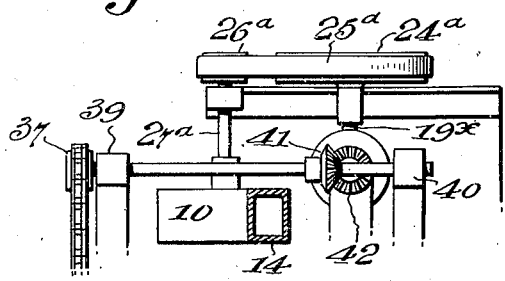

Dec. 7, 1937.   J. D. RUST ET AL   2,101,100
COTTON PICKING MACHINE
Filed Oct. 16, 1935   4 Sheets-Sheet 3
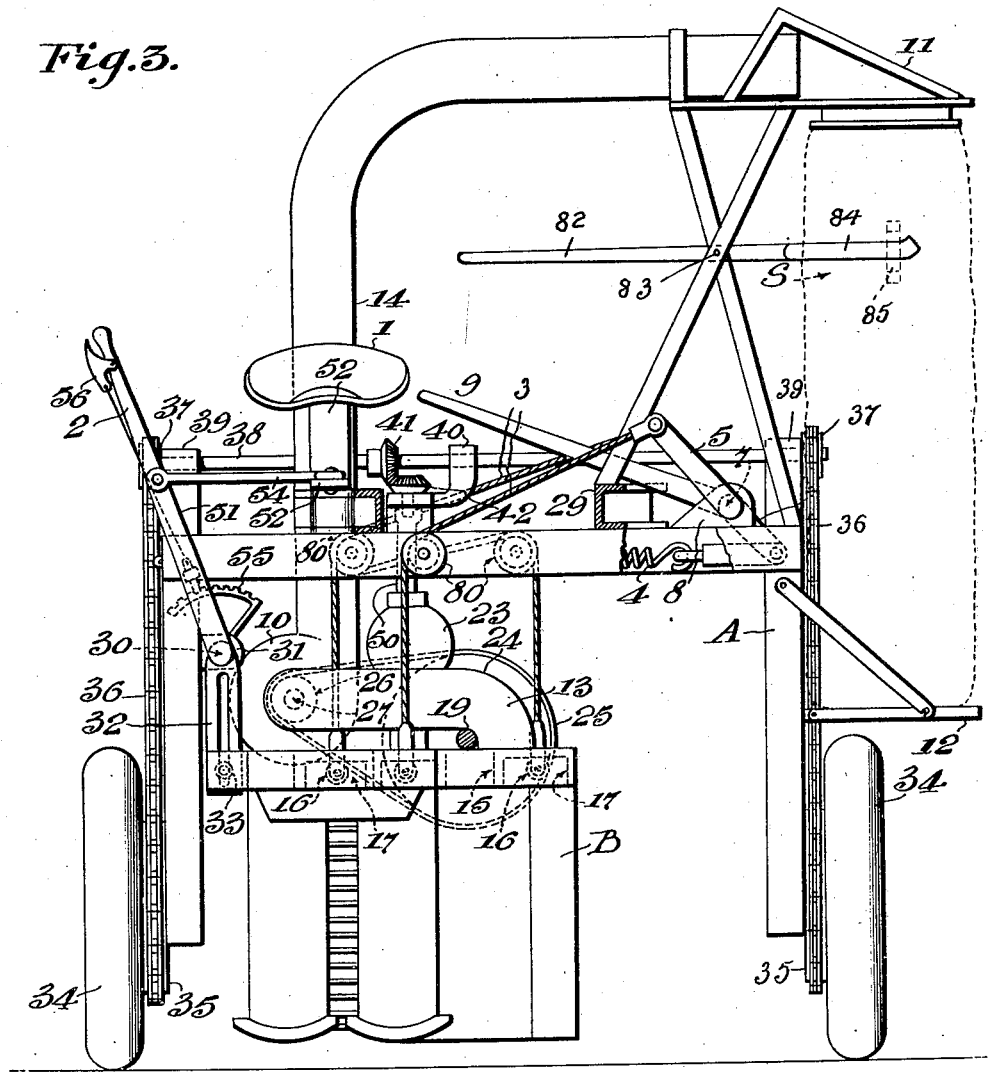
Inventors
JOHN D. RUST
MACK D. RUST
By Albert E. Dieterich
Attorney Dec. 7, 1937. J. D. RUST ET AL 2,101,100
COTTON PICKING MACHINE
Filed Oct. 16, 1935 4 Sheets-Sheet 4

Inventors
JOHN D. RUST
MACK D. RUST
By Albert E. Dieterich
Attorney

Patented Dec. 7, 1937

2,101,100

UNITED STATES PATENT OFFICE 2,101,100

COTTON PICKING MACHINE

John D. Rust and Mack D. Rust, Memphis, Tenn.

Application October 16, 1935, Serial No. 45,337

20 Claims. (Cl. 56—14)

Our present invention relates to cotton picking machines of a type similar to that disclosed in our Patent #1,894,198 granted January 10, 1933, the present invention embodying certain improvements over those disclosed in our applications Serial Numbers 678,670, 723,423, 733,687 and 26,363.

An object of the invention is to provide a cotton picking machine that may be pulled by an ordinary row-crop tractor and derive its power for driving the picking unit's mechanism from the traction wheels of the machine itself instead of driving the same by a power take-off from the tractor.

Another object is to provide an improved means for suspending the picking unit from the traveling frame so that it may be moved vertically and horizontally without tilting the unit, thereby keeping the unit parallel to the ground while permitting it to rise and fall and be guided laterally along the cotton row to some extent independently of the course of the tractor.

Another object is to provide means to suspend the picking unit from the carrying frame in a manner so that it may rise and fall vertically under manual control and be held against free lateral movement at all times and yet be capable of being moved laterally by and at the will of the operator.

Another object is to provide an endless conveyor type elevator for discharging the cotton from the receiving box of the doffing mechanism, the elevator being driven from the main shaft of the unit, though, preferably by the chain which drives the doffer.

Another object is to provide a combined shock absorber and spindle conditioner located at the entrant end of the picking unit whereby the spindles after being moistened and in passing around the sprockets at the front of the unit will have their momentum retarded and at the same time be conditioned for most effective action as soon as the spindles enter the tunnel and penetrate the plants.

Other objects will in part be obvious and in part be pointed out hereinafter.

To the attainment of the aforesaid objects and ends, the invention still further resides in those novel details of construction, combination and arrangement of parts, all of which will be first fully described in the following detailed description, and then be pointed out in the appended claims, reference being had to the accompanying drawings, in which:

Figure 2 is a side elevation thereof.

Figure 3 is a front elevation of the machine, a part of the tongue being removed.

Figure 4 is a detail plan view of a portion of a machine showing how the blower, as well as the picking mechanism of the unit, may be driven from a traction wheel of the machine.

Figure 7 is an enlarged detail view of the means for connecting the suspending cables to the picking unit so as to allow lateral adjustment of the unit without swinging the same pendulously.

Figure 8 is a vertical cross section on the line 8—8 of Figure 7.

Figure 1:
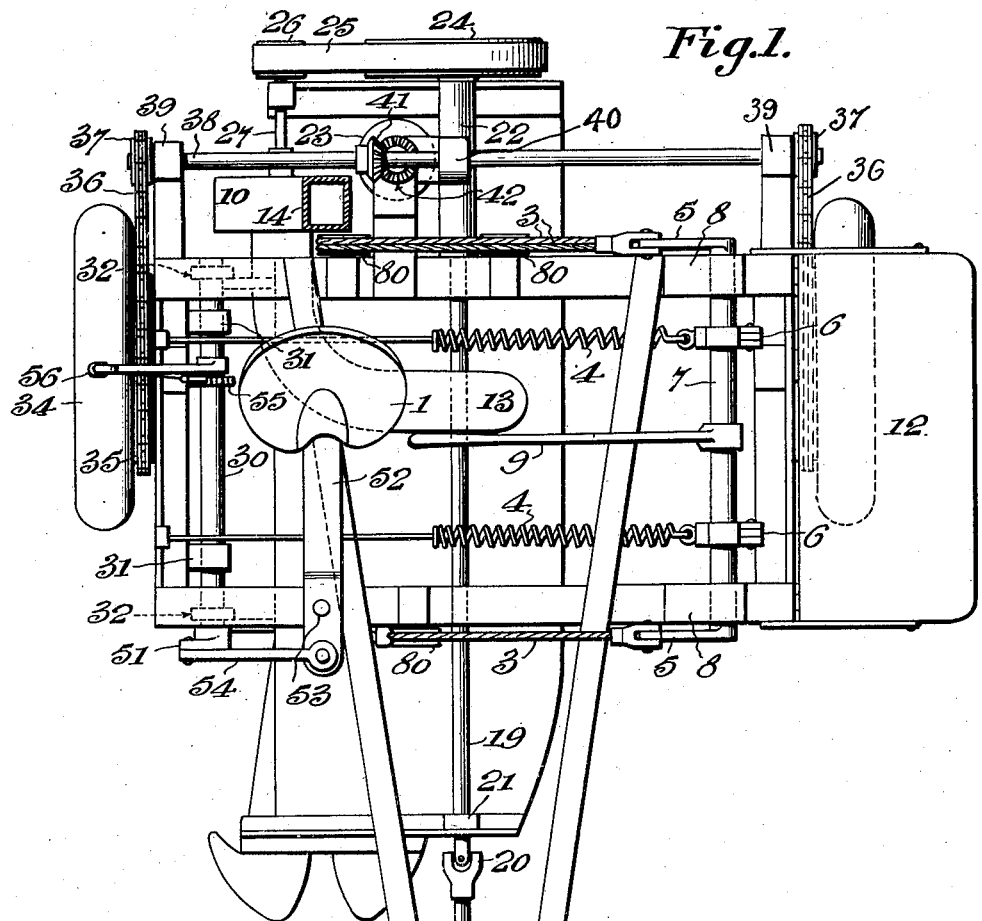
Figure 1 is a top plan view of our improved cotton picking machine.

In the drawings, in which like numerals and letters of reference indicate like parts in all of the figures, A represents a truck-like carrying frame and B indicates the picking unit. The unit is carried suspended by the frame A, preferably by means of cables 3 and sheaves 80 (see Figure 3).

Referring now more particularly to Figures 1-3, it will be observed that 1 designates the operator's seat which is carried by a support 52 that is pivoted at 53 and connected by a link 54 to the arm 51 on the shaft 30. The shaft 30 has a lever 2 for manually controlling the lateral position of the picking unit B in relation to the carrying frame A.

The weight of the picking unit B is suspended by the cables 3 and is counterbalanced by adjustable springs 4 acting through arms 5 and 6 which are securely fastened to a shaft 7 that is in turn pivoted in or against bearings 8. A hand lever 9 is provided on the shaft so as to enable the operator to raise or lower the picking unit B at will.

The shaft 30 is mounted in bearings 31 and is provided with slotted lever arms 32 to receive the pins 33 on the unit B so that by rocking the lever 2 the unit B may be moved sidewise with parallel motion while remaining free to rise and fall vertically.

In order to permit the lateral movement or adjustment of the picking unit B without raising or lowering it at the same time (as is the case with a pendulous movement) the cables 3 have strap carrying rollers 16 to operate in slots 17 in hangers secured to the unit B (see Figures 3, 7 and 8).

In order to hold the unit B against sidewise motion, the lever 2 may be provided with a suitable latch device 56 for engaging with a rack segment 55 to hold the shaft 30 stationary. By releasing the latch 56 the operator then has the lateral adjustment of the lever B under control at all times and can effect such adjustment by first pulling or pushing on the lever 2 and/or secondly by moving his seat sidewise.

The blower fan 10 of the unit B (when the blower type of discharge mechanism is used) draws cotton from the picking unit from suction pipe 13 and delivers it through exhaust pipe 14 against screen 11 from which it drops into a sack S (see dotted lines, Figure 3) resting on a platform 12.

By referring now more particularly to Figures 1 and 2 it will be seen that power for the blower is shown as taken from the power takeoff (not shown) of the tractor through shafts 18, universal joint 20, shaft 19, pulley 24, belt 25, pulley 26, to blower shaft 27. The shaft 18 is mounted in a bearing 21 and a bearing assembly 22.

Instead of driving the blower through a power takeoff from the tractor it may be driven by a shaft 19x and bevel gear assembly (not shown) within the housing 23, from the shaft 50.

Figure 5:
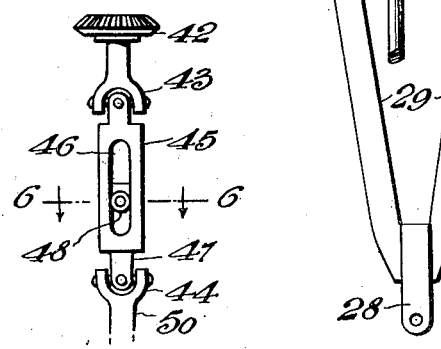
Figure 5 is a detail assembly elevational view of the telescope drive shaft and its connections from the countershaft to the main shaft of the picking unit.
Figure 6:
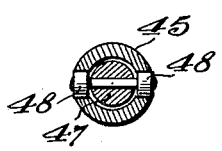
Figure 6 is a cross section on the line 6—6 of Figure 5.

The shaft 50 is driven from the traction wheels 34 of the machine in the following way: A sprocket 35 is connected to each wheel 34 through a suitable one-way ratchet clutch (not shown, but similar to those commonly used in mowing machines). Chains 36 take around the sprockets 35 and around sprockets 37 on a countershaft 38 which is mounted in suitable bearings 39 and 40. A bevel gear 41 on the countershaft 39 meshes with a bevel gear 42 which drives the main shaft 50 of the picking unit B. This drive is accomplished through a telescopic shaft 45—47 and universal joints 43—44 (see Figures 2, 5 and 6).

The shaft 45—47 comprises two members, the member 45 being a sleeve and the member 47 being a rod projecting into the sleeve and having rollers 48 on a cross pin 49. The rollers operate in slots 46 in the member 45. This construction allows the unit B to rise and fall and to be moved laterally without interfering with the drive.

Figure 9:
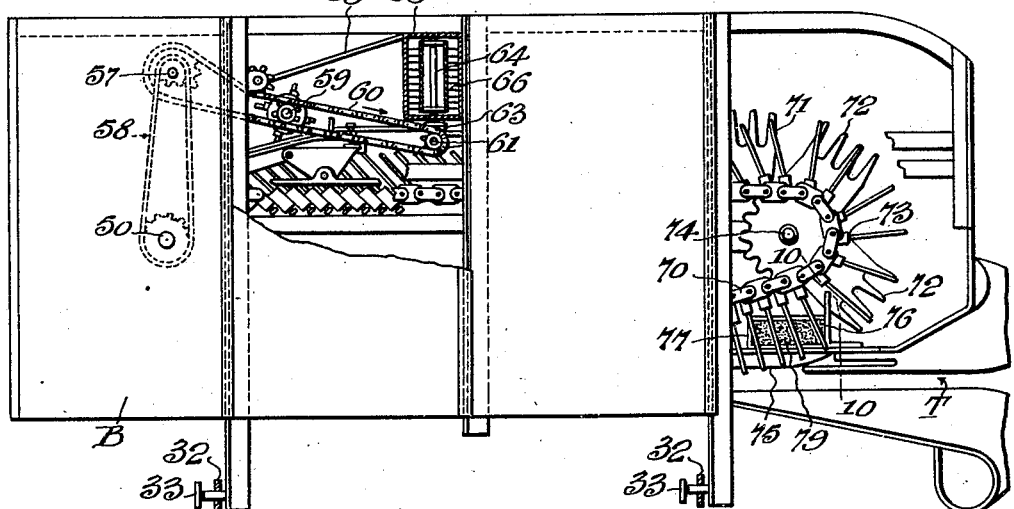
Figure 9 is a top plan view (parts of the housing being removed) of a picking unit embodying our improvements.
Figure 11:
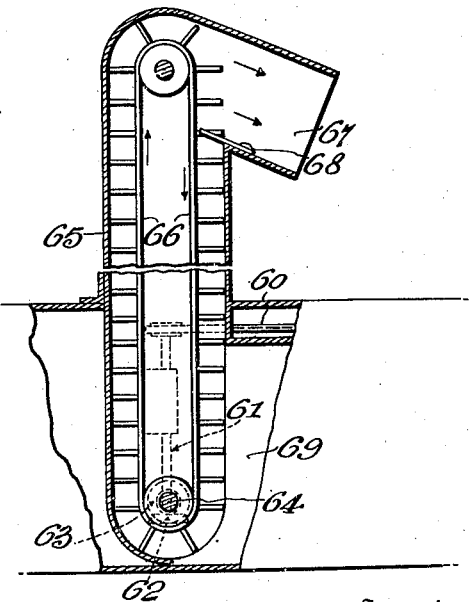
Figure 11 is a detail vertical section of the elevator.

Referring now more particularly to Figures 9 et seq. the improvements to the picking unit itself will be seen. In Figures 9 and 11 is shown an elevator for raising the picked cotton from the doffing mechanism and delivering it from the machine. This elevator may be used in place of the blower mechanism if desired. This elevator consists of a casing 65 in which is mounted an endless belt 66 with spikes or teeth to receive and lift the cotton and discharge the same through the outlet spout 67. A comb 68 may be provided to ensure the cotton's detachment from the teeth or spikes. The elevator receives the cotton directly from the box 69 into which the doffing mechanism delivers it.

The elevator is driven by having its shaft 64 connected with a vertical countershaft 61 through bevel gears 62—63, the former being on shaft 61 and the latter on shaft 64. The shaft 61 is driven by a sprocket and by the chain 60 which drives the usual doffer 59 from the idler shaft 57 which in turn is driven by sprocket and chain drive 58 from the main shaft 50 of the unit.

Figure 10:
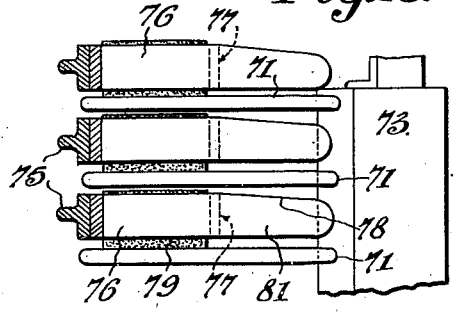
Figure 10 is an enlarged detail vertical section on approximately the line 10—10 of Figure 9.

By reference to Figures 9 and 10 it will be observed that we have provided in one device a means to absorb the shocks of the moving spindles and retard the velocity thereof and also to condition the spindles 71 before they enter the tunnel T to penetrate the plants. This device consists in the provision of a set of brackets 76 secured to any suitable fixed part of the machine as, for example, the stalk guards 75. The brackets 76 project between horizontal rows of spindles 71 and carry straps or yokes 77 in which float blocks 79 of abrasive material. The blocks rest on several spindles at a time. As the blocks are located at the front of the spindle conveyor to be engaged by the spindles as they swing around the sprockets of the spindle slat carrier, they will not only condition the surfaces of the spindles but will act as shock absorbers to cut down the momentum of the traveling spindles. The brackets 76 have finger-like projections whose top (and bottom, if necessary) edges are inclined so as to straighten out any bent spindles that may encounter the fingers in passing the same.

The spindle conveyor chains are indicated by 70, the spindles by 71, the spindle guards by 72 and the spindle carrying slats by 73. The shafts carrying the sprockets for the chains are indicated by 50 and 74.

In Figures 2 and 3 is shown a means whereby the operator can jolt the sack S up and down for packing the cotton in the sack in order to get the full benefit of its capacity. This is accomplished, in the embodiment illustrated, by providing a lever 82 pivoted at 83 and having a fork 84 to engage loops 85 on the sides of the sack S. The operator by moving the lever 82 up and down may shake the sack to settle its contents.

Figure 12:
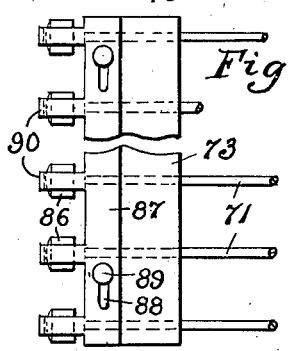
Figure 12 is a side elevation of a spindle retaining means in use.
Figure 13:
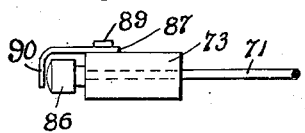
Figure 13 is a plan view thereof.

In Figures 12 and 13 is shown a means to retain the spindles in their slats. This means comprises, for each slat, a plate 87 having slots 88 through which pass the studs 89 which hold the plate in place on the slat. The plate 87 has a set of fingers 90 which embrace the spindle rollers or heads 86, as clearly shown in Figure 13. The slots 88 are so arranged that gravity will tend to maintain the plates 87 with their fingers 90 in alignment with the head ends of the spindles. By raising the plates 87 the fingers 90 are lifted clear of the spindle rollers 86 so that the spindles may be withdrawn when repairs or replacements become necessary.

*Operation*

As the machine is driven through the field the wheels straddle two rows, the unit B picking the cotton from one row. The cotton stalks enter the picking mechanism through the throat itself.

As the machine moves forward the cotton stalks enter the tunnel T (see Figure 4) of the picking mechanism where the plants are engaged by the spindles 71, the cotton being wrapped around the spindles and removed from the bolls as the plants pass along the tunnel. As the spindles pass through this tunnel at the picking side of the machine, they are moved rearwardly at the same rate of speed that the machine is traveling forwardly. This timing of the speed allowed the spindles to gather the open cotton from the plants without harm to the stalks of green bolls. The spindles are rotated incident to their rearward motion, resulting in the cotton being wound about them. The outer wall of the tunnel presses the stalks and bolls into contact with the spindles to enable them effectively to gather the open cotton from the bolls. Passing further along toward the rear of the tunnel T, the spindles with the cotton wound around them are gradually withdrawn from the tunnel and from the plants, the plants being held from following the spindles by reason of the presence of the guards 75.

The cotton ladened spindles are now carried around the rear sprockets. As the spindles swing around the rear sprockets they throw loose from themselves the bulk of any trash gathered from the stalks, and the trash is discharged through a suitable opening provided in the floor of the housing, as in the machine of our application, Serial No. 678,670, aforesaid.

The spindles in passing around the axis 50 pass into the stripping devices where the spindles are doffed and the cotton deposited into the receptacles 69, the cotton being thrown toward the elevator by the doffer 59 (or withdrawn by suction and discharged by air blast if the blower—Figures 1, 2 and 3 is used).

As the spindles arrive at the front of the machine and pass around the axis 74 they will engage the abrasive blocks 79 which act as shock absorbers and also serve to take off any polish which the spindles may have acquired, thereby placing the spindles in such condition that they will again effectively remove the cotton from the bolls.

The blocks 79 prevent a polished surface from developing on the spindles.

From the foregoing description, taken in connection with the accompanying drawings, it is thought that the construction, operation, and advantages of our invention, together with the novel features thereof, will be clear to those skilled in the art.

What we claim is:

1. In a cotton picking machine, an endless-chain-carried set of spindle-carrying slats whose spindles are arranged in a plurality of horizontal rows, a tunnel through which the spindles are carried to gather cotton, and a combined shock-absorbing and spindle-surface-conditioning means located adjacent the entrance of the tunnel.

2. In a cotton picking machine, an endless-chain-carried set of spindle-carrying slats whose spindles are arranged in a plurality of horizontal rows, a tunnel through which the spindles are carried to gather cotton, and a combined shock-absorbing and spindle-surface-conditioning means located at the front of the machine to be engaged by the spindles before they enter the tunnel.

3. In a cotton picking machine, an endless-chain-carried set of spindle-carrying slats whose spindles are arranged in a plurality of horizontal rows, a tunnel through which the spindles are carried to gather cotton, a combined shock-absorbing and spindle-surface-conditioning means located adjacent the entrance of the tunnel, and said means comprising anchored floating elements of abrasive material in contact with which the spindles are passed.

4. In a cotton picking machine, an endless-chain-carried set of spindle-carrying slats whose spindles are arranged in a plurality of horizontal rows, a tunnel through which the spindles are carried to gather cotton, a combined shock-absorbing and spindle-surface-conditioning means located adjacent the entrance of the tunnel, said means comprising anchored floating elements of abrasive material in contact with which the spindles are passed, the floating elements resting continuously on a plurality of spindles.

5. In a cotton picking machine, a carrying truck, a cotton picking unit, means for suspending said unit from said truck for vertical movement, weight counterbalancing means cooperating with said suspending means, means to move the picking unit laterally without displacing the suspending means, and operator controlled normally locked means whereby the operator may move the unit rectilinearly sidewise to guide the unit on the row to some extent independently of the course of the carrying truck.

6. In a cotton picking machine, a carrying truck, a cotton picking unit, means for suspending said unit from said truck for vertical movement, weight counterbalancing means cooperating with said suspending means, said suspending means including at least three cables having rollers, hangers on the picking unit, one for each cable, said hangers having transverse slots and said cables having rollers operating in said slots, and operator controlled normally locked means whereby the operator may move the unit rectilinearly sidewise for guiding the unit on the row to some extent independently of the course of the carrying truck.

7. In a cotton picking machine, a carrying truck, a cotton picking unit, means for suspending said unit from said truck for vertical movement, weight counterbalancing means cooperating with said suspending means, means to move the unit rectilinearly laterally without displacing the suspending means, said unit moving means including an operator controlled means comprising a pivoted seat for the operator and connections between said seat and said unit in virtue of which the operator by moving the seat sidewise may move the unit sidewise to guide the unit on the row to some extent independently of the course of the truck.

8. In a cotton picking machine, a carrying truck, a cotton picking unit, means to mount said unit to rise and fall with respect to the frame and for being moved laterally thereof, an operator's seat pivotally mounted on the frame, a connection between said seat and said unit whereby the operator by moving the seat on its pivot can move the unit sidewise for guiding the unit on the row to some extent independently of the course of the carrying truck.

9. In a cotton picking machine, a carrying truck, a cotton picking unit, means to mount said unit to rise and fall with respect to the frame and for being moved laterally thereof, an operator's seat pivotally mounted on the frame, a connection between said seat and said unit whereby the operator by moving the seat on its pivot can move the unit sidewise for guiding the unit on the row to some extent independently of the course of the carrying truck, and means to lock the seat at will against movement on its pivot.

10. In a cotton picking machine, a carrying truck, a cotton picking unit, means to mount said unit to rise and fall with respect to the frame and for being moved laterally thereof, an operator's seat pivotally mounted on the frame, a connection between said seat and said unit whereby the operator by moving the seat on its pivot can move the unit sidewise for guiding the unit on the row to some extent independently of the course of the carrying truck, means to lock the seat at will against movement on its pivot, and said locking means including a latch device to hold the seat against swiveling.

11. In a cotton picking machine, a carrying truck, a cotton picking unit, means to mount said unit to rise and fall with respect to the frame and for being moved laterally thereof, an operator's seat pivotally mounted on the frame, a connection between said seat and said unit whereby the operator by moving the seat on its pivot can move the unit sidewise for guiding the unit on the row to some extent independently of the course of the carrying truck, means to lock the seat at will against movement, said locking means including an auxiliary unit-moving lever operatively connected with said picking unit, and a latch device cooperating with said lever to hold it against movement.

12. In a cotton picking machine, a carrying truck, a cotton picking unit, means to mount said unit to rise and fall with respect to the frame and for being moved laterally thereof, an operator's seat pivotally mounted on the frame, a connection between said seat and said unit whereby the operator by moving the seat on its pivot can move the unit sidewise for guiding the unit on the row to some extent independently of the course of the carrying truck, means to lock the seat at will against movement on its pivot, said locking means including an auxiliary unit-moving lever operatively connected with said picking unit and said seat, and a latch device cooperating with said lever to hold it against movement.

13. In a cotton picking machine, a wheeled truck, a cotton picking unit having a main shaft, means for suspending the unit from the frame, a countershaft on the truck, driving connections between one of the truck's wheels and said countershaft, a power transmitting shaft connection between said countershaft and said main shaft and including a telescopic shaft with universal joints to permit vertical and lateral movements of the picking unit to be effected without effecting the actions of said shafts.

14. In a cotton picking machine, a wheeled truck, a cotton picking unit having a main truck, means for suspending the unit from the frame, and including means by virtue of which the unit may be moved up and down and sidewise in rectilinear directions, a countershaft on the truck, driving connections between one of the truck's wheels and said countershaft, a power transmitting shaft connection between said countershaft and said main shaft and including a telescopic shaft with universal joints to permit vertical and lateral movements of the picking unit to be effected without effecting the actions of said shafts.

15. In a cotton picking unit, a plurality of rotatable smooth picking spindles and means to carry the same throughout an endless path; in combination with a combined shock-absorbing, spindle-surface-conditioning and spindle-straightening means.

16. In a cotton picking unit, a plurality of rotatable smooth picking spindles and means to carry the same throughout an endless path, a tunnel through which the plants are passed and into which the spindles are inserted and from which they are withdrawn; in combination with a combined shock-absorbing, spindle-surface-conditioning and spindle-guiding means located adjacent the entrant end of the tunnel to affect the spindles before they enter the tunnel.

17. In a cotton picking unit, a plurality of rotatable smooth picking spindles and means to carry the same throughout an endless path; in combination with a combined shock-absorbing, spindle-surface-conditioning and spindle-guiding means, said combined means comprising brackets with inclined fingers and yokes, in which yokes abrasive blocks are floatingly located, said brackets being positioned between horizontal rows of spindles so that the blocks rest on a plurality of spindles at all times.

18. In a cotton picking machine, an endless traveling member, a plurality of picking spindles journaled in apertures of said traveling member, said spindles having enlargements at one end, the spindles being insertable into said apertures with said enlargements serving as stops in one direction, and inner retaining means adjacent said enlargements serving as stops in the opposite direction and preventing undue inward movement of said spindles, said spindle retaining means being carried on said traveling member.

19. In a cotton picking machine, an endless traveling member including slats, a plurality of picking spindles journaled in apertures of said slats, said spindles having enlargements at one end, the spindles being insertable into said apertures with said enlargements serving as stops in one direction, and inner retaining means adjacent said enlargements serving as stops in the opposite direction and preventing undue inward movement of said spindles, said spindle retaining means being carried on the slats.

20. In a cotton picking machine, an endless traveling member including slats, a plurality of picking spindles journaled in apertures of said slats, said spindles having enlargements at one end, the spindles being insertable into said apertures with said enlargements serving as stops in one direction, and inner retaining means adjacent said enlargements serving as stops in the opposite direction, said retaining means comprising a member mounted on the slat, said member having hook like elements adjacent the enlargements of each of the spindles for preventing undue inward movement of said spindles, and means for sliding said retaining member lengthwise of the slat for removing the spindles.

JOHN D. RUST.
MACK D. RUST.